March 14, 1967 T. J. COCHRAN ETAL 3,308,977
AUTOMATIC TRAY HANDLER
Filed Oct. 4, 1965 12 Sheets-Sheet 1
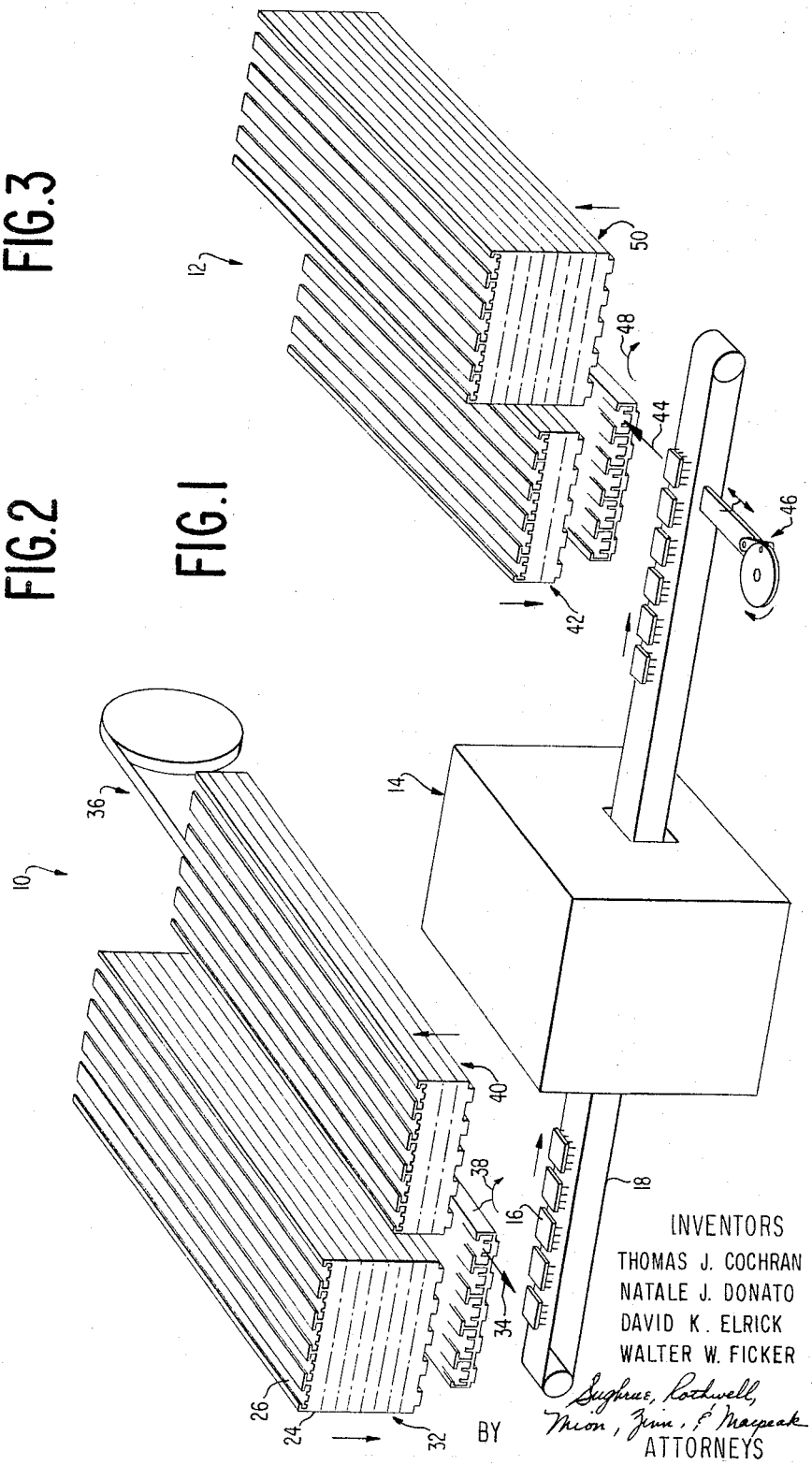
INVENTORS
THOMAS J. COCHRAN
NATALE J. DONATO
DAVID K. ELRICK
WALTER W. FICKER
BY Sughrue, Rothwell,
Mion, Zinn, & Macpeak
ATTORNEYS

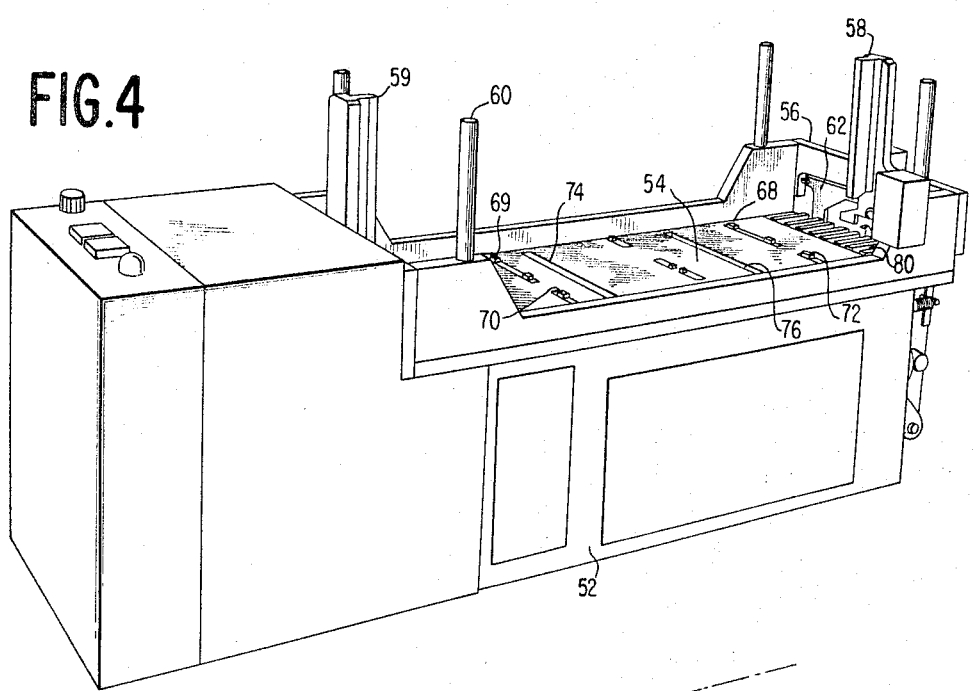
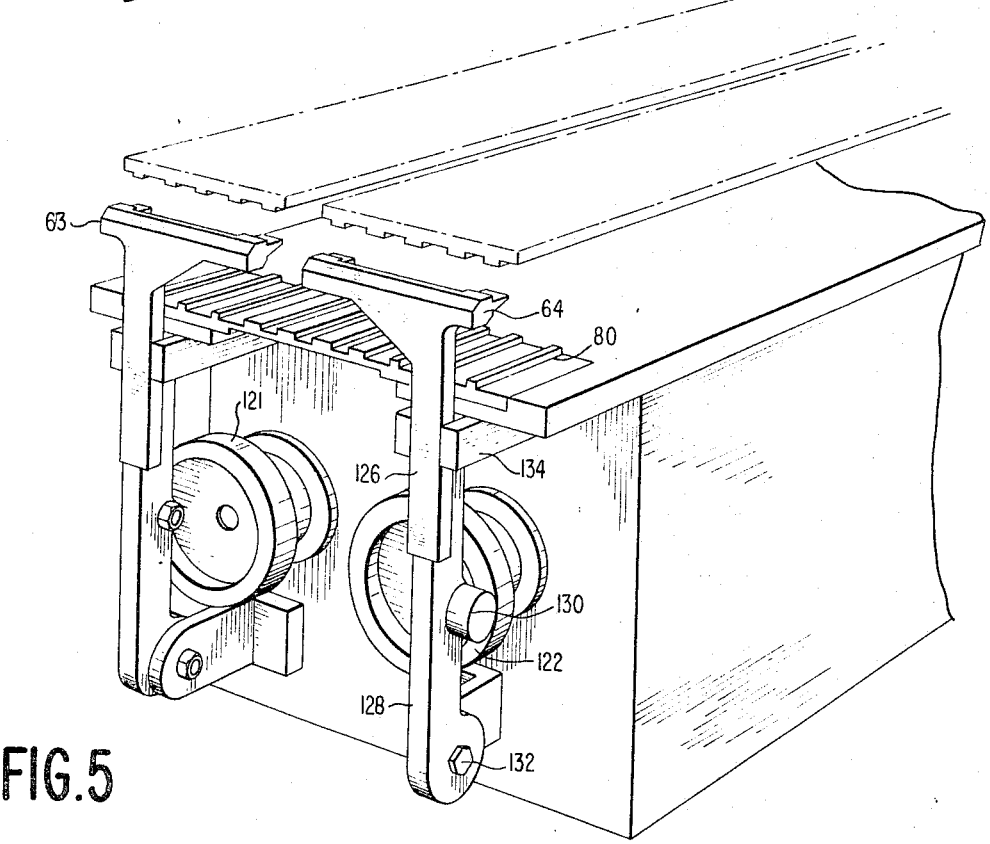

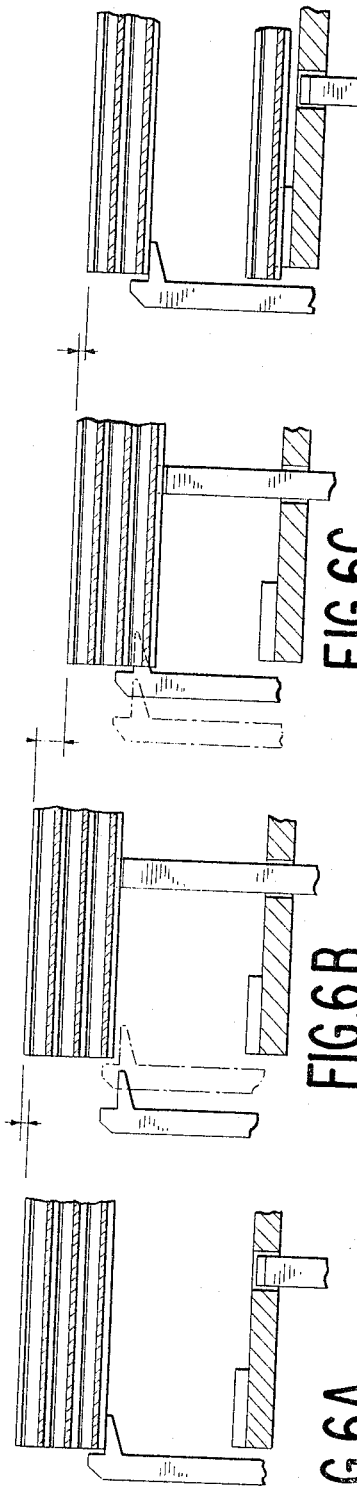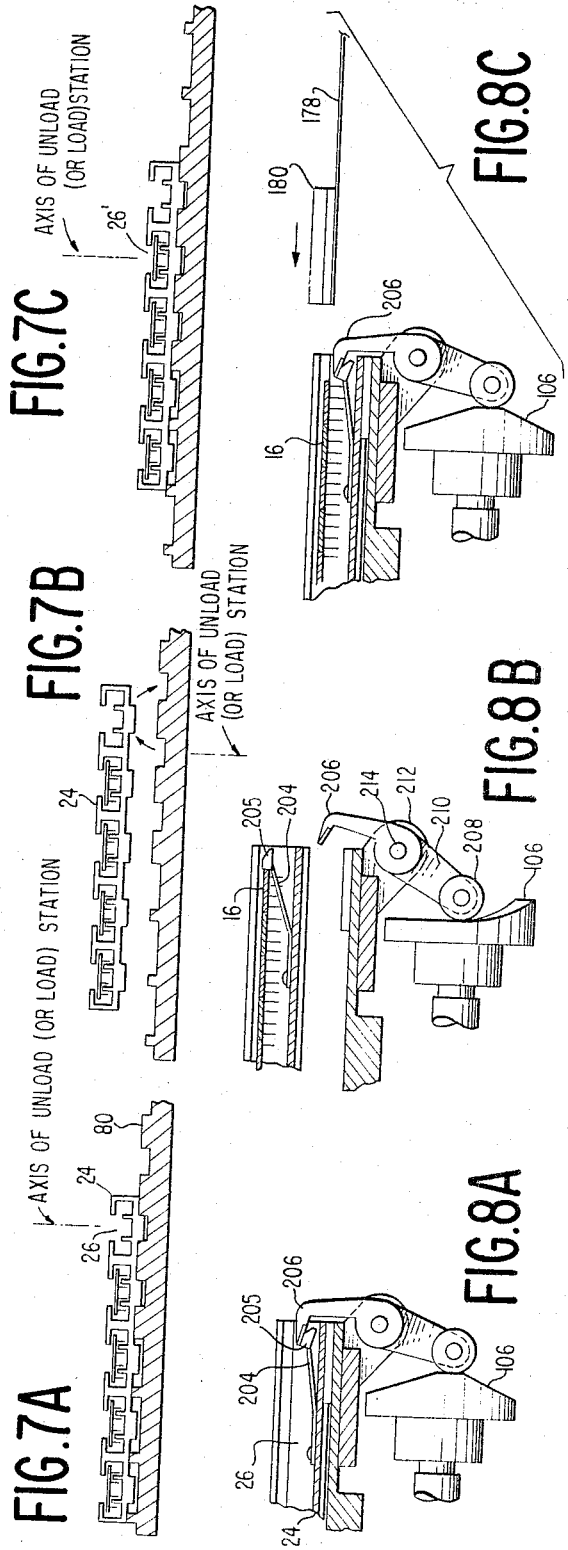

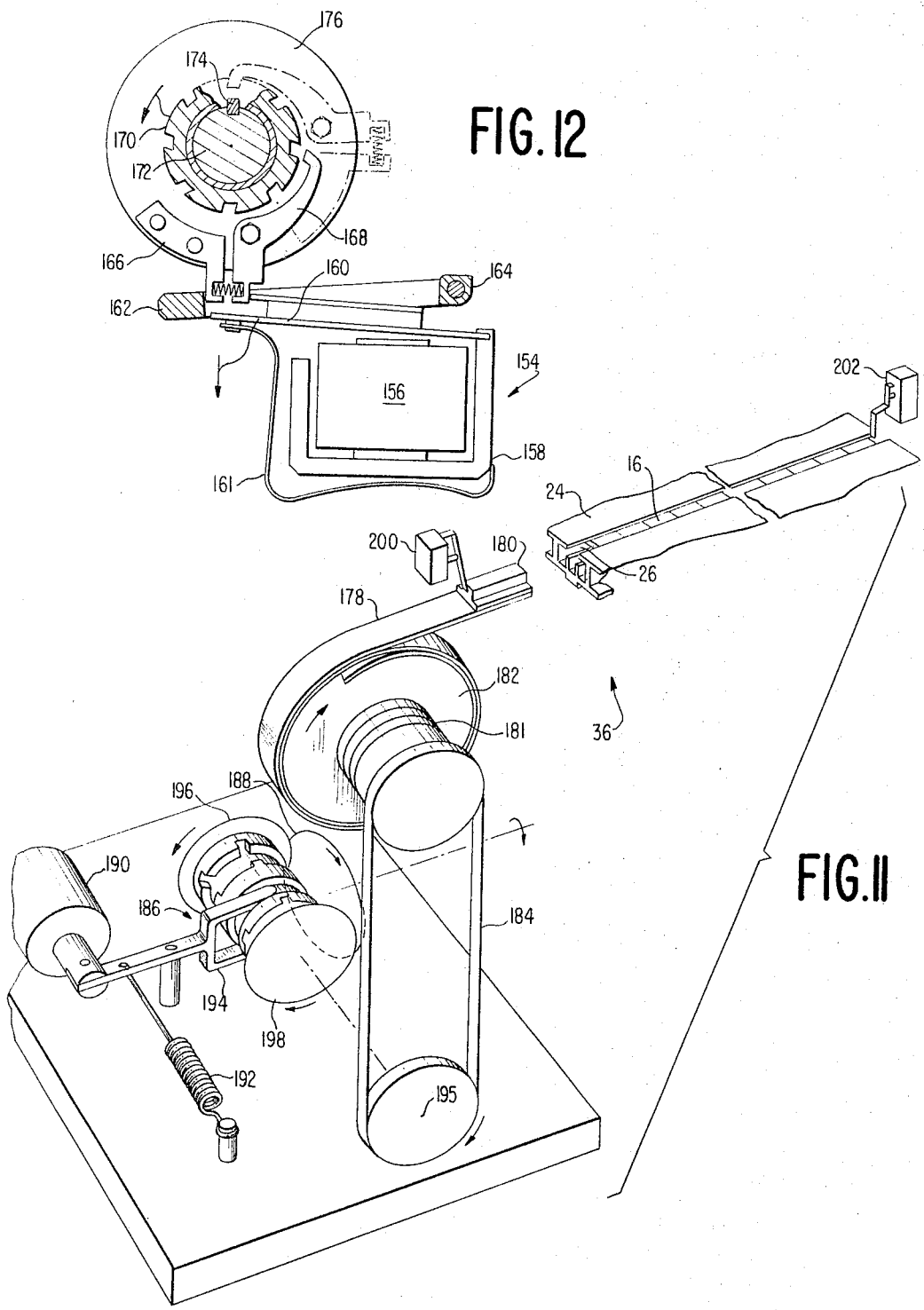

March 14, 1967 T. J. COCHRAN ET AL 3,308,977
AUTOMATIC TRAY HANDLER
Filed Oct. 4, 1965 12 Sheets-Sheet 9
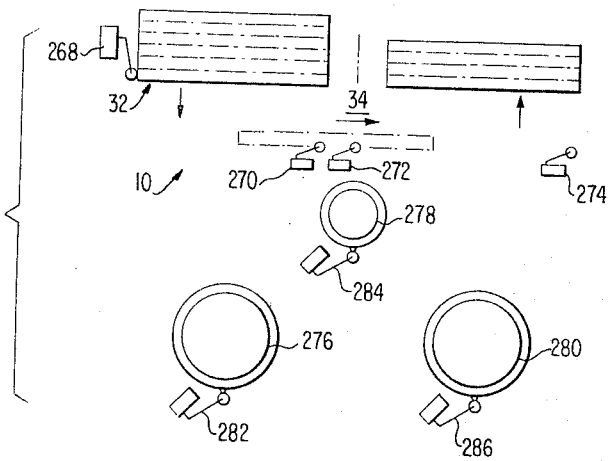
FIG.18
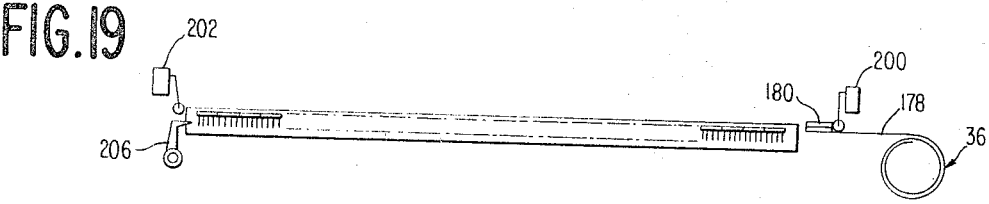
FIG.19
FIG.20
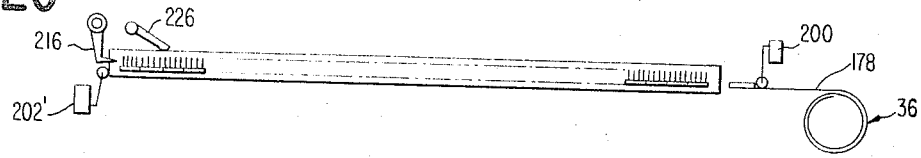
FIG.21
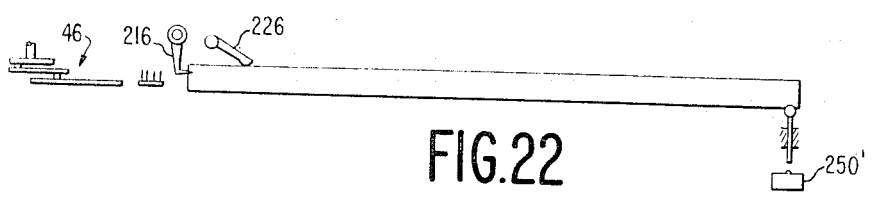
FIG.22

March 14, 1967  T. J. COCHRAN ET AL  3,308,977
AUTOMATIC TRAY HANDLER
Filed Oct. 4, 1965                                  12 Sheets-Sheet 11
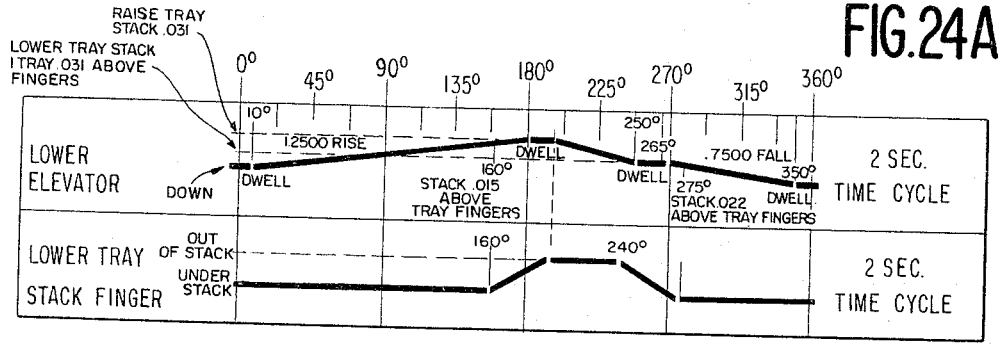
FIG.24A
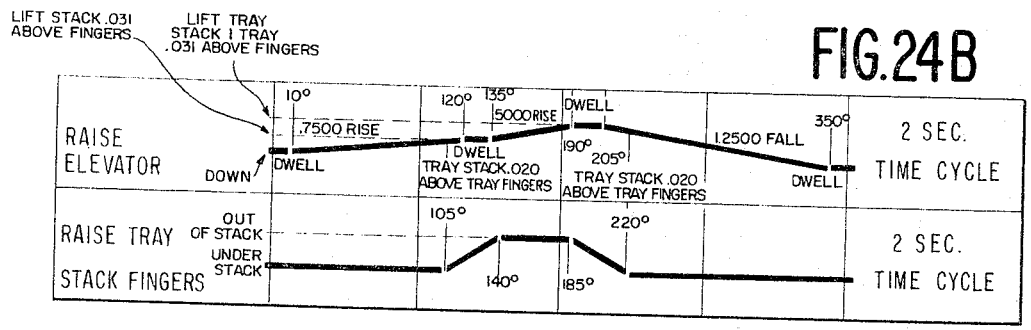
FIG.24B
FIG.24.C
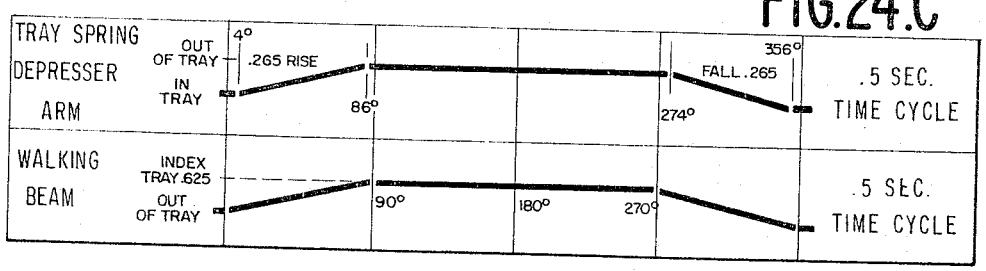
FIG.25
| CAM DATA CHART | | |
|---|---|---|
| CAM | MAKE | BREAK |
| 276 | 350° | 25° |
| 278 | 350° | 25° |
| 280 | 355° | 30° |
FIG.27
| CAM DATA CHART | | |
|---|---|---|
| CAM | MAKE | BREAK |
| A1 | 350° | 25° |
| A2 | 350° | 25° |
| A3 | 355° | 30° |
| A4 | 355° | 325° |

United States Patent Office 3,308,977
Patented Mar. 14, 1967

3,308,977
AUTOMATIC TRAY HANDLER
Thomas J. Cochran, La Grangeville, and Natale J. Donato, Millbrook, N.Y., David K. Elrick, Burlington, Vt., and Walter W. Ficker, Fishkill, N.Y., assignors to International Business Machines Corporation, Armonk, N.Y., a corporation of New York
Filed Oct. 4, 1965, Ser. No. 492,472
15 Claims. (Cl. 214—301)

This invention relates to improvements in efficiently handling trays and loading and unloading articles into and out of the trays.

In the automatic production of many small and similar shaped articles, and particularly electronic modular circuits, it is highly desirable and known in the art to carry a number of such articles in article handling trays. These trays are unloaded, that is the articles are taken out of them, when work is to be performed on the articles and after the work is performed the trays are again loaded. This invention advances the state of the art in efficiently handling trays and the loading and unloading of articles in and out of the trays.

In the prior art, trays used for handling the same articles were gravity fed and, therefore, had to be supported on an incline, and had to rely on the impositive feeding action of gravity acting upon small lightweight articles. Although horizontal tray handlers are known in the art generally, recycling of trays and continuous loading and unloading of trays on both sides of a work station as in the present invention appears to be novel. This invention provides a unique electromechanical device capable of manipulating trays so that articles carried by the trays may be either loaded or unloaded into or from the trays.

In general, this invention incorporates an automatic horizontal tray handling system for positively handling trays and feeding articles contained in channels in the trays in which there is an automatic tray unloader on one side of a work station for unloading and recycling trays and an automatic tray loader on another side of the work station for automatically loading trays with the articles worked on and recycling the loading trays continually. The loader and the unloader have substantially the same internal mechanism and each features a tray supporting arrangement for supporting two stacks of trays, one to be loaded and the other to be unloaded. Beneath the stacks of trays is a horizontal work surface including a load or unload station. Trays from one stack are lowered by an elevator and fed into a step by step manner by a walking beam mechanism past the load or unload station. At the load or unload station articles adapted to be carried in the channels in the tray are loaded or unloaded and the tray is indexed channel by channel until completely loaded or unloaded. At this time, another elevator raises the tray into the other stack of trays. The above operations are repeated automatically until the load stack of trays has been depleted.

For unloading articles from the tray an unloading unit is included in the tray handler and this unloading unit includes a pusher attached to a tape which is driven through a channel of the tray at the unload station. For loading articles in the trays a pusher blade pushes the articles into a channel at the load station until an electrical switch indicates that the channel is full and at this time the pusher is stopped while the tray is indexed. The system is completely automatic and electrically controlled in accordance with the requirements of loading, unloading and handling of the trays.

The foregoing and other objects, features and advantages of the invention will be apparent from the following more particular description of preferred embodiments of the invention, as illustrated in the accompanying drawings.

In the drawings:

FIG. 1 is a perspective and somewhat schematic view of the automatic tray handling system of this invention including an automatic tray loader and an automatic tray unloader;

FIG. 2 is a sectional view through a portion of a tray for carrying articles having pins extending downwardly;

FIG. 3 is a view similar to FIG. 2 through a tray inverted carrying the articles with pins extending upwardly;

FIG. 4 is a perspective view of a tray loader or unloader;

FIG. 5 is a front elevation view of a tray loader or unloader showing operation of tray stack support arms;

FIGS. 6A–6D are sectional elevation views showing the operation of tray support arms and tray elevators in the tray lowering and raising sequences;

FIGS. 7A–7C are sectional elevations showing the step by step feeding of a tray past a load or unload station;

FIGS. 8A–8C are sectional elevation views showing the operation of a tray spring hold down finger;

FIG. 11 is a perspective view of the unloading tape and drive;

FIG. 12 is a sectional view of a single revolution clutch utilized to energize the drive;

FIG. 18 is a schematic view of the electrical control switches operable for tray loader or unloader;

FIG. 19 is a schematic view of an unloader for articles having the pins downwardly;

FIG. 20 is a schematic view of an unloader having the pins up;

FIG. 21 is a schematic view of a loader for articles having pins extending down;

FIG. 22 is a schematic view of a loader for articles having pins extending up;

Figure 26:
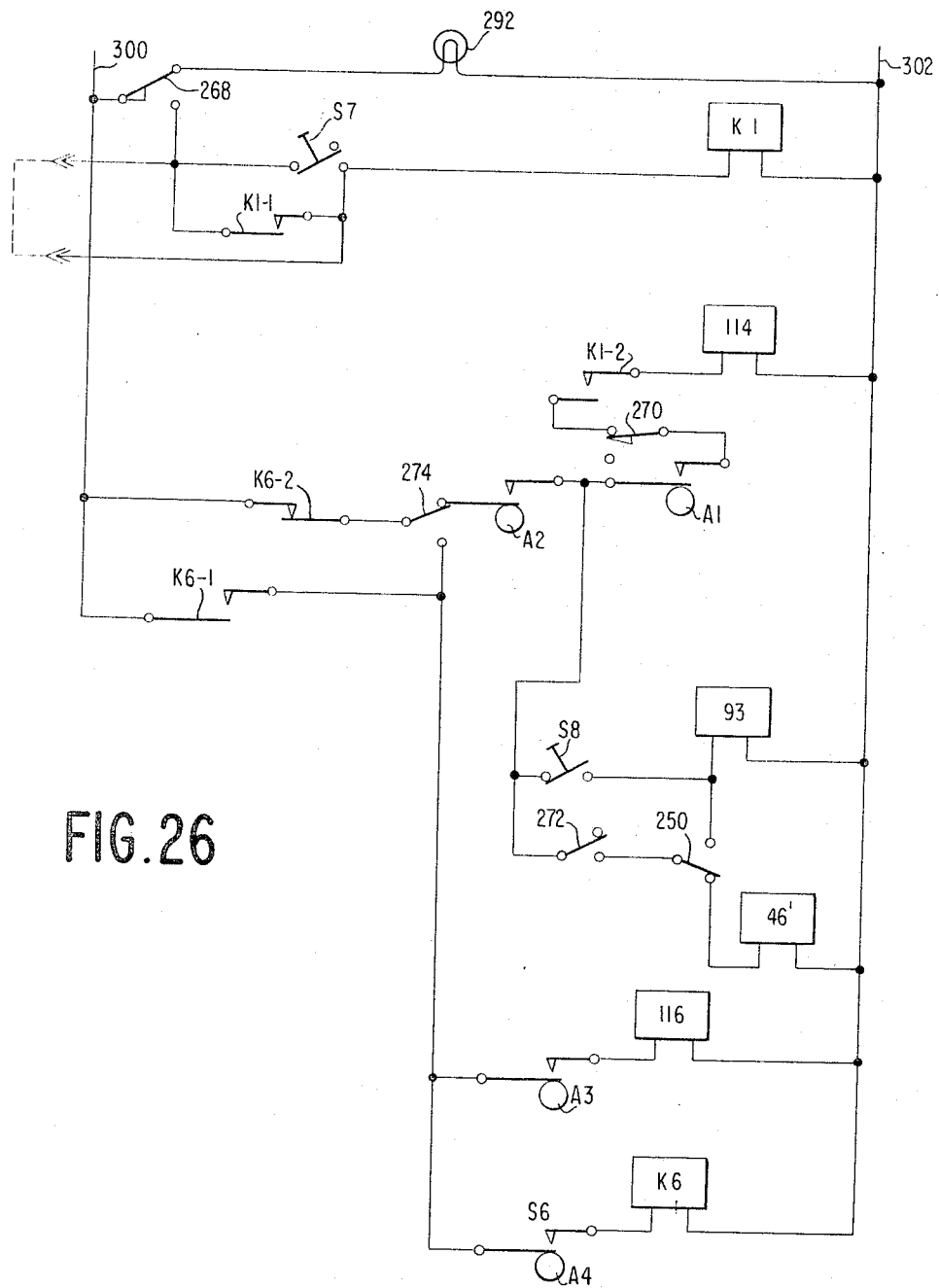

FIGS. 24A–C are timing charts for the loader or unloader;

FIG. 25 is a cam data chart;

FIG. 26 is an electrical circuit diagram for the unloader; and

FIG. 27 is a cam chart for the unloader.

Referring to FIG. 1, an automatic tray handler system is illustrated in perspective. The system includes a tray unloader 10 and a tray loader 12 which are on opposite sides of a work station 14 of any known type. Articles 16 are unloaded from the unloader and fed by a conveyer 18 through work station 14 to the loader 12.

The articles in the described embodiment are electronic circuit modules including a substrate base 20 carrying circuits and components and having extending contact pins 22. It is apparent, however, that the invention is not limited to any specific shaped articles such as the circuit modules.

The tray unloader 10 and tray loader 12 both are adapted to automatically handle and recycle a plurality of identical trays 24. Each tray includes a plurality of longitudinally extending channels 26 for holding a plurality of articles 16 abutting against one another. As shown in FIGS. 2 and 3, the articles may be carried with their pins 22 extending downwardly or extending upwardly and the trays are arranged so that they may be inverted. Whether or not the pins of the articles extend up or down depends on the nature of the work done in work station 14. In addition to the channels 26 there are lugs 28 on the opposite sides of the tray from the channels and ribs 30 in the channels for supporting the articles as shown in FIG. 2 when the pins are down.

As shown in FIG. 1, the tray unloader 10 carries a stack 32 of loaded trays and these trays are lowered one at a time until a channel of the tray is aligned with an unload station 34. At this time unload means 36 to be described in detail hereinafter unload the articles 16 from the channel. The tray is then walked a step at a time as indicated by walking arrow 38 to position the next channel at the unload station 34. After a tray is completely unloaded it is raised up to the bottom of an empty stack 40. Suitable arrangements for holding the stacks 32 and 40 of trays above the unload station 34 for raising and lowering the trays and for walking the trays will be described hereinafter as are the electrical controls and interlocks.

After the articles 16 have been worked on at the work station 14 a conveyer 18 feeds them to the tray loader 12 where they are loaded into identical trays 24. The tray loader is substantially similar in major respects to the unloader and includes an empty stack 42 of trays which are held above a horizontal surface and lowered one at a time to position each channel of a tray at a load station 44. A loader means including pusher 46 pushes articles 16 one at a time into a channel in the tray until the channel is filled. Then the tray is walked one step as indicated by walking arrow 48 and the next channel filled. This continues until a tray is filled and then the tray is raised up to the bottom of a loaded stack 50 of trays while an unloaded tray is positioned with its channel to receive articles from the loader means 46 and the recycling of the trays continues. The loaded stack 50 and empty stack 40 may be removed from the system from time to time and additional filled trays may be placed on stack 32 of articles which have not been worked on and additional empty trays may be placed on stack 44, for example the trays from stack 40 may be placed on stack 42.

Since the tray unloader 10 and tray loader 12 are substantially similar in all major respects with the exception of the unloading means 36 and loading means 46 and adjuncts thereto, the description will be directed to a loader or unloader which can function for either purpose with deviations from the general purpose handler noted.

Referring to FIG. 4, there is shown a loader or unloader including a housing 52 housing a drive assembly and control circuits and having a horizontal table surface 54 at the top of the housing. A superstructure 56 surrounds the edges of table 54 and supports T-shaped tray stack guides 58 and 59 as well as post-type tray guides 60.

The stacks 32, 40, 42 and 50 of trays shown in FIG. 1 are held above the surface of horizontal table 54 by tray support arms 62, 63, 64 and 66, there being one support arm having two fingers at each end of a stack of trays for each loader or unloader unit.

For raising a tray from the surface of table 54 or bringing a tray down from the stack to the table 54 elevators are provided under each stack of trays. These are shown in FIG. 4 as tray elevators 68, 69, 70 and 72.

For causing each tray to walk a step at a time as shown by walking arrows 38 and 48 in FIG. 1, there are provided walking beam slots 74 and 76 for walking beams 78 and 79 to walk each tray across the surface 54 a channel at a time in front of either the load or unload station.

Locating guides 80 are positioned in the surface of table 54 for cooperating with the lugs 28 or the channels 26 of the trays 24.

Figure 16:
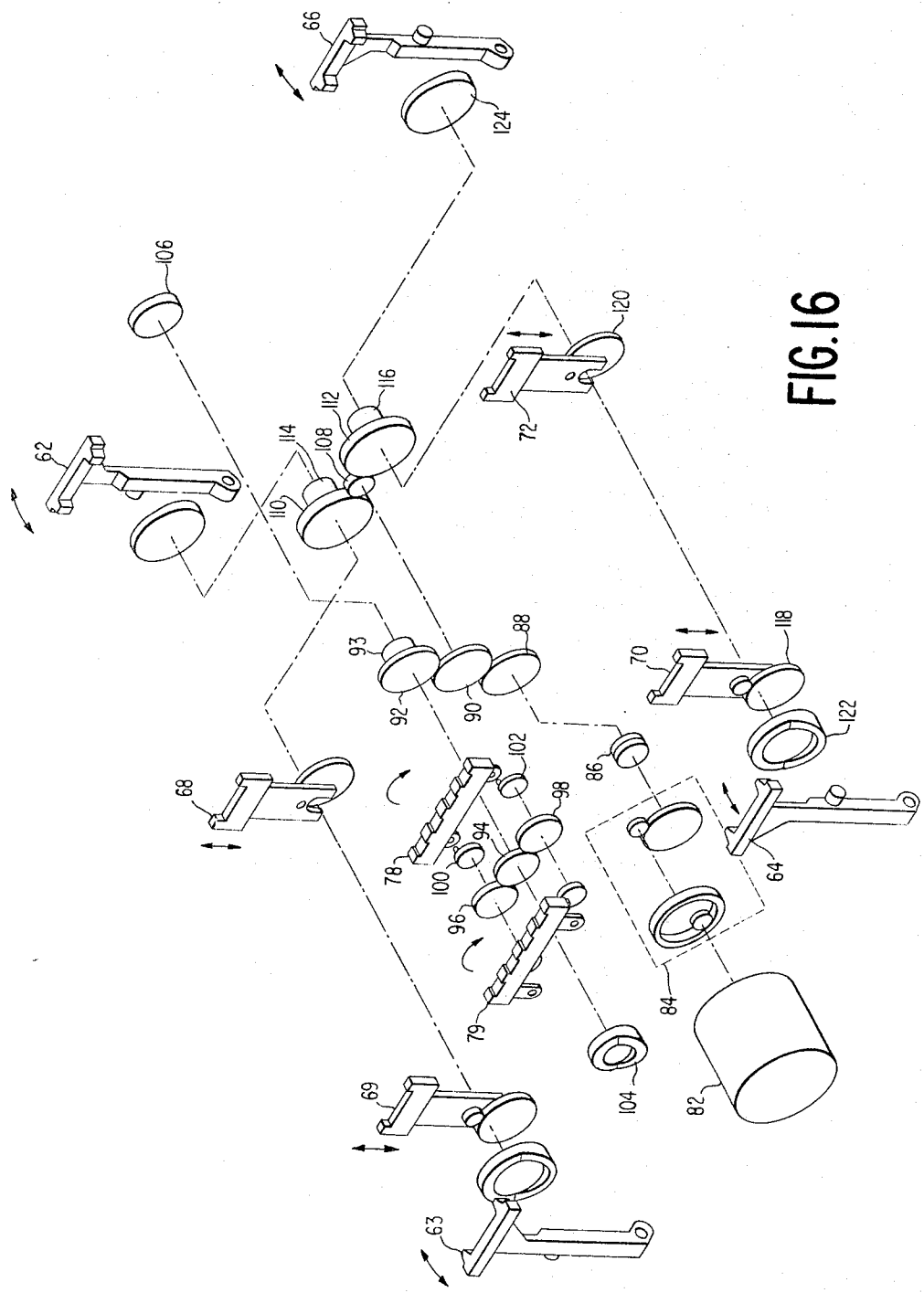
FIG. 16 is an exploded perspective view of the drive train of a loader or unloader.

The arrangement for driving the tray support arms, tray elevators and walking beams can best be seen from the exploded view of the drive train, FIG. 16, especially when considered with other detailed views. Referring to FIG. 16, a drive motor 82 drives the operating mechanism for each loader or unloader through a gear reduction unit 84 and an overload clutch 86. A drive gear 88 is in mesh with an accessory gear 90 which in turn is in mesh with an index drive gear 92 through an index clutch 93. On the same shaft as index gear 92 is a gear 94 in mesh with gears 96 and 98 for driving eccentrics 100 and 102 for each walking beam 78 and 79. Face cams 104 and 106 are used to operate the tray spring hold down fingers as will be described.

The elevators and tray stack arms are operated from an accessory shaft having accessory pinion 108 in mesh with gears 110 and 112 through the control of clutches 114 and 116. Clutch 114 controls, for example, the lowering of a tray from a stack of trays by elevators 68 and 69 while clutch 116 is actuated at a suitable time in the cycle to control the raising of a tray by elevators 70 and 72. Since both sides driven by gears 110 and 112 are identical, only the sides driven by gear 112 will be described in detail. Under the control of clutch 116 gear 112 drives eccentric cams 118 and 120 which raise and lower elevators 70 and 72, respectively. Additional face cams 122 and 124 on the same shaft control the pivotal movement of tray stack arms 66 and 64 to support and release a stack of trays above elevators 70 and 72.

Figure 17:
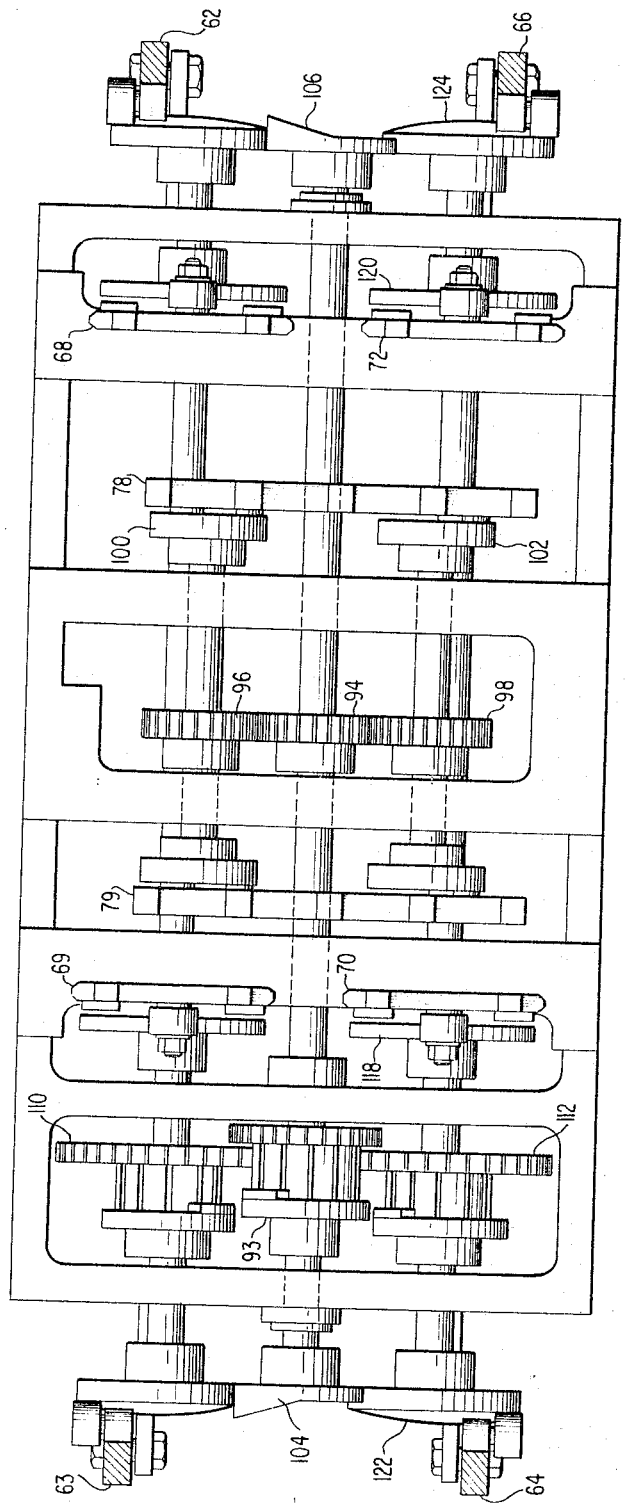
FIG. 17 is a plan view of a drive of a loader or unloader with the cover removed.

FIG. 17 shows the actual mechanism of the exploded view of FIG. 16.

FIG. 5 shows the operation of the tray stack arms in more detail. More particularly, there are two tray stack arms, one at each end of each stack of trays in the loader or unloader. Since each loader is substantially identical, only one need be described. Referring to arm 64 in FIG. 5, this arm is mounted on a lever 126 attached to a cam follower lever 128 which in turn has a cam follower 130 secured thereto. The cam follower 130 follows the track on face cam 122 and moves about pivot point 132 to move the arm 64 in an oscillating manner back and forth toward the stack of trays. Guides 134 are provided to guide the movement.

Figure 9:
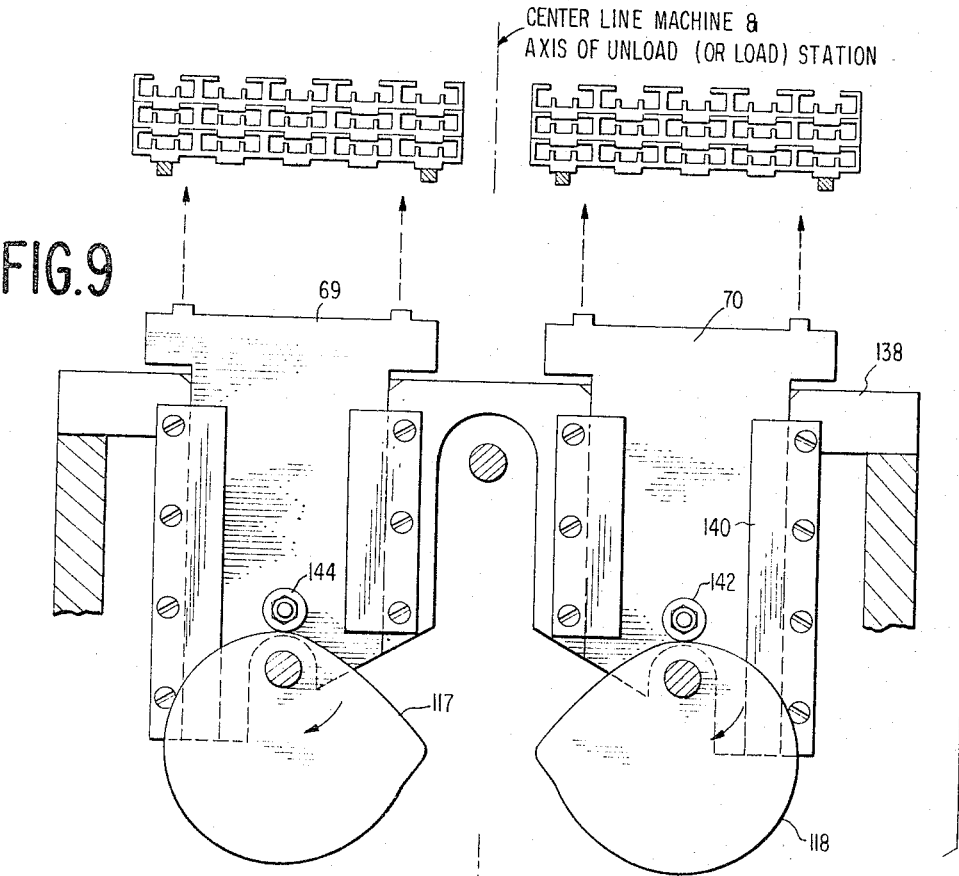
FIG. 9 is a sectional elevation view illustrating the operation of tray elevators.

FIG. 9 illustrates the operation of the elevators. For example, elevators 69 and 70 are driven by cams 117 and 118 attached to the respective accessory drive shafts as shown in FIGS. 16 and 17. The elevators are guided between frame 138 and guide plates 140 in up and down movement. The drive from the eccentrics 117 and 118 to the elevators is by means of cam follower rollers 142, 144 attached to each elevator and bearing on each cam.

Figure 10:
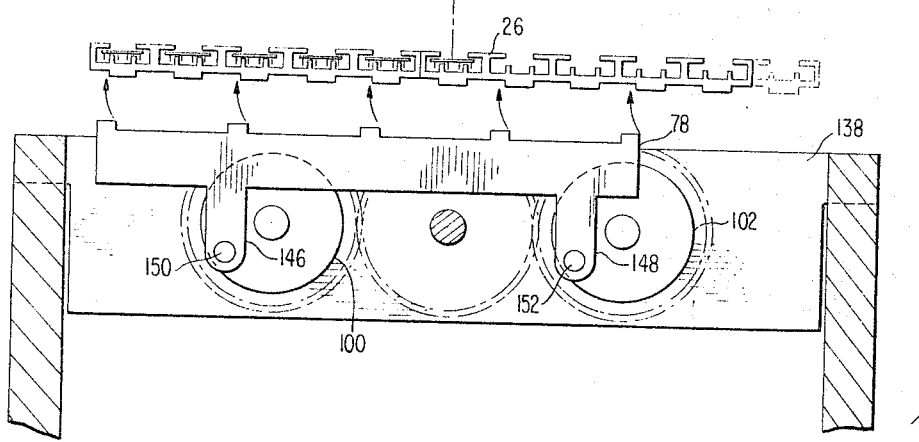
FIG. 10 is a sectional elevation view illustrating operation of the step by step tray feeding means including a walking beam.

FIG. 10 illustrates the drive of a walking beam such as walking beam 78. The walking beam has two extensions 146 and 148 which are connected at pivot points 150 and 152 eccentrically of the center of wheels 100, 102, thus forming eccentrics so that rotation of these wheels simultaneously causes the walking beam 78 to move up and over relative to the slot in which the walking beam operates to in effect walk each tray over one step at a time.

FIGS. 6A–6D show the tray lowering in sequence FIGS. 6A, B, C, D. The tray raising sequence is FIGS. 6D, C, B, A. In lowering trays the elevators are moved up to support the tray and lift the tray off the tray support arms at which time the tray support arms move back, allowing the elevators to start down and as the elevators start down the tray support arms are moved back in to support the next tray lowering sequence. In the tray raising sequence, the elevators are moved up to support the tray and the tray support arm is moved outwardly, the elevators then continue their upward movement and the tray support arms are moved back in to support the bottom of the stack and then the elevators are moved back down to the initial position of FIG. 6A.

FIGS. 7A–7C show the feed of a tray 24 by the walking beams. Assuming a channel 26 at the load or unload station indicated by the phantom lines in FIGS. 7A–7C has been emptied, then the index clutch 93 is energized to cause the walking beam shaft to rotate and the walking beams to lift up the tray 24 to the position shown in FIG. 7B and move the tray over to the right to the position shown in FIG. 7C, at which time a second channel 26' of the tray is in position at the load or unload station, in this case ready to be unloaded.

Each of the clutches, the index clutch 93 and load and unload clutches 114 and 116 may be identical, and are of the type shown in FIG. 12. This is a one revolution electromagnetically controlled clutch which is actuated in sequence determined by existing conditions in the loader or unloader. The electromagnetic clutch includes a magnet assembly 154 having a coil 156 and yoke 158 and an armature 160 which is normally biased upwardly by spring 161. A latch 162 pivoted at 164 is provided and a latching lug 166 is secured to a drive plate 176. A drive pawl 168 is pivotally mounted on the drive plate 176 to cooperate with grooves in driven gear spline 170. A one revolution shaft 172 is keyed by key 174 to drive plate 176. When the electromagnet 154 is momentarily energized the drive pawl 168 is released and engages the rotating driver gear spline 170. After the shaft 172 has rotated one revolution the drive pawl is stopped by the electromagnetic armature 160 which disengages the pawl by causing it to pivot about pivot 169 from the spline 170.

The tray unloader 10 is provided with unload means 36 shown in more detail in FIG. 11. This unload means includes a steel pusher tape 178 having a pusher block 180 secured to the end thereof. The pusher tape is wound on tape drum 182 which in turn is driven selectively in opposite directions by drive belt 184 through a slip clutch 181 under the control of a reversible differential bevel gear drive mechanism 186 which is coupled to an accessory shaft having a bevel gear 188. Actuation of the reversible shifter assembly is accomplished by solenoid 190 biased in one direction by spring 192 operating a pivoted shifter 194 to selectively engage belt drive pulley 195 with either bevel gear 196 or bevel gear 198, depending upon the direction of rotation desired and the direction of feed of the pusher tape.

Suitable electric switches 200 and 202 are positioned in the path of the pusher block 180 to determine by actuation of the switches the physical presence of the block at either its forward position at actuating switch 202 or its retracted position at actuating switch 200.

Each of the trays 24 has a spring 204 with an article or blocking tip 205 mounted within and positioned adjacent each end of each channel 26. Referring to FIGS. 8A, B and C, there is shown an arrangement for holding down the trap spring 204 at the time that articles 16 in channel 26 are to be unloaded. The same arrangement is at each end of the channel at the unload station, and an identical arrangement is at the entrance end of a channel at the load station of the loader. The arrangement shown in FIGS. 8A–C is, however, for the arrangement wherein the articles 16 are fed with the pins down. Referring specifically to the figures, tray spring 204 is adapted to be held down by hold down finger 206 which in turn is actuated by cam 106 contacted by cam follower roller 208 on cam follower lever 210, which in turn is pivoted on bracket 212 at pivot point 214. The hold down position is shown in FIG. 8A.

Figure 13A:
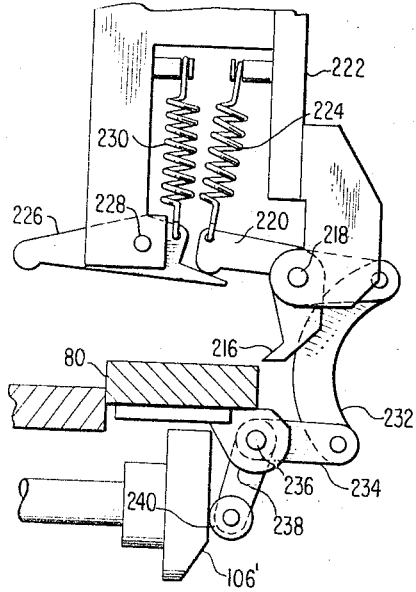
FIGS. 13A and 13B are sectional elevation views illustrating the operation of tray spring hold down fingers for inverted trays.
Figure 13B:
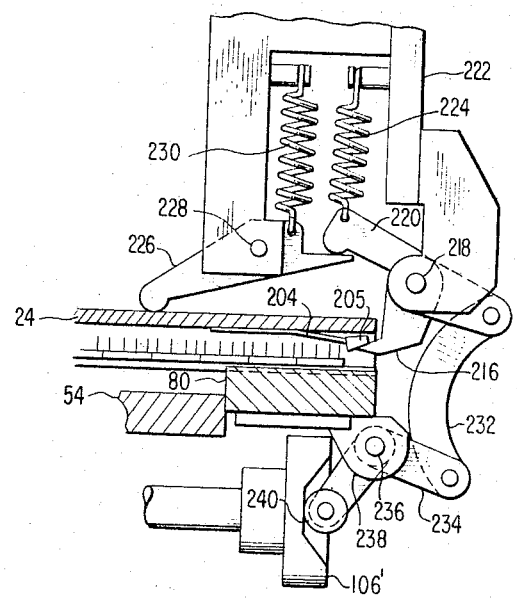

For holding down spring 204 when the trays 24 are inverted, a different arrangement must obviously be used. This different arrangement is shown in FIGS. 13A and 13B when in effect the spring 204 must be held up and to counteract the pressure there must be a tray hold down finger. Referring to FIG. 13A, a tray spring depressor arm 216 is shown in retracted position. This arm is pivoted at pivot 218 to rotate with the movement of linkage arm 220. A support bracket 222 functions as an anchor for spring 224 which biases the linkage arm 220 in a clockwise position about pivot 218 and, therefore, biases tray spring depressor arm 216 to a normally spring depressing position shown in FIG. 13B. Bracket 222 also carries a tray hold down arm 226 pivoted thereto at pivot 228 and biased to a normal hold down position by spring 230. The tail-end of arm 226 and the tip of linkage 220 cooperate as shown in FIGS. 13A and 13B, so that in the retracted position arm 226 is held out of contact with a tray 24, while in the tray spring depressing position of FIG. 13B the arm 226 holds down the tray 224 against the upward depressing action of arm 216. For controlling the actuation of the tray spring depressor arm and consequently the tray hold down arm, there is linkage connected to arm 220 including connecting link 232 and a cam follower crank 234 pivoted at 236 to bracket 238 and having a cam follower roller 240 for following the contour of face cam 106'. It can be seen that the high point of cam 106' will cause the tray spring depressor arm 216 and tray hold down arm 226 to be in a retracted position shown in FIG. 13A and the low point of cam 106' will allow the springs biasing arms 216 and 226 to pull these arms into the position shown in FIG. 13B. As with the tray spring depressor shown in FIGS. 8A–8C, there would be a tray spring depressing arrangement of the type shown in FIGS. 13A and 13B for the unload end of the unloader for articles with the pins up and for the loading end of the loader for articles with the pins up.

For the opposite end of the channel of the loader there is, of course, no need or reason to depress spring 204 since this will stop the articles 16 from being pushed on out the back end of groove 26 of tray 24. There is, however, need to sense when the articles 16 completely fill a groove at the load station of the loader and, therefore, electrical sensing switches of the type shown in FIGS. 14 and 15 may be utilized at this position, the FIG. 14 arrangement being for trays carrying articles with the pins down and the FIG. 15 arrangement for articles with the pins up.

Figure 14:
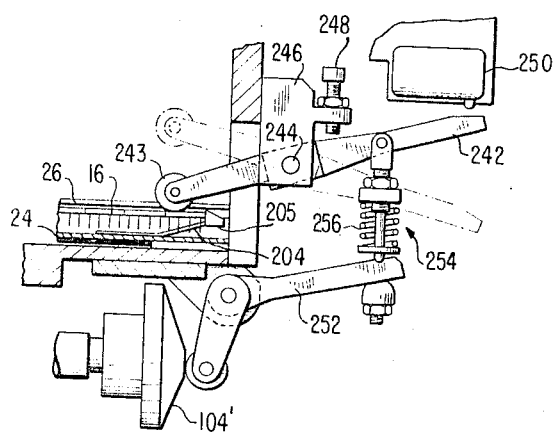
FIG. 14 is a sectional view illustrating a switch for detecting the filling of a tray channel on loading of trays carrying articles with the pins down.

Referring to FIG. 14 for the showing of a full position sensing mechanism for the arrangement in which the articles 16 in the grooves 26 in tray 24 in the loader have their pins down, and are loaded against the blocking tip 205 on spring 204, the arrangement includes a switch actuator arm 242 pivoted at 244 in bracket 246, which bracket is provided with a stop screw 248. The tip of arm 242 may actuate switch 250, and movement of actuator arm 242 is controlled by actuator arm assembly 252 under the control of actuator arm cam 104', and this actuator assembly includes an arm pull down connection 254 providing for lost motion with an adjustable force spring 256. In normal operation, with substrates being loaded into channel 26 but not being full, the high point of cam 104' pushing up on spring 256 will cause the arm 242 to pivot counterclockwise from the position shown in FIG. 14 and actuate switch 250. At the time the channel 26 is full of articles 16, the last article pushes up on roller 244 moving arm 242 clockwise to the position shown and moving away from switch 250. Thus switch 250 gives an indication that channel 26 is full and the device is ready to be indexed to the next channel. At this time the actuator arm 242 must be moved out of position and must be moved to the phantom line position shown in FIG. 14. This is accomplished on the control of cam 104' which pulls down on the connection 254 further moving arm 242 clockwise to the phantom line position. Stop 248 is positioned so that when the arm 242 is pivoted down into an empty channel 26, it will actuate switch 250 but not damage the same.

Figure 15:
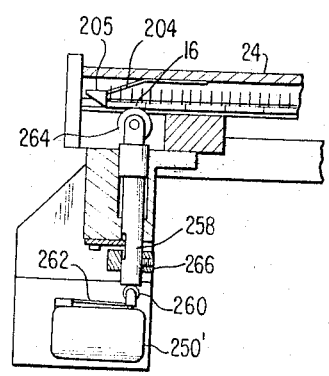
FIG. 15 is a sectional elevation view showing an electrical sensing means for detecting the filling of a channel in a tray carrying articles with the pins up.

FIG. 15 shows the arrangement of a full position switch for an inverted tray 24 with the pins of the articles 16 extending up. In this embodiment a full position switch 250' is actuated by a depressor rod 258 which acts on a switch roller 260 biased upwardly by spring 262. The depressor rod has a roller 264 at its upper end for detecting an article 16 in the full position. An adjusting nut 266 limits the upward movement of depressor rod 258. In this case, with the groove in tray 24 not yet filled, the depressor rod will be moved up from the position shown in FIG. 15 and the switch will be open. When the last article 16 gets to the full position it is contacted by roller 264 depressing depressor rod 258 and actuating switch 250'.

FIGS. 19 and 20 show the unloader with the substrates having pins down in FIG. 19 and pins up in FIG. 20 to illustrate the arrangements at each end of the groove of the tray 24 at the unload station. As can be seen in FIG. 19, when the pins are down there is a spring hold down finger 206 of the type shown in FIGS. 8A–8C at each end of the groove 26 and the feed mechanism 36, including feed tape 178 of the type shown in FIG. 11, is provided at one end. Switches 200 and 202 are at each end of the tray to detect the position of the tape pusher 180 and these are positioned above the tape.

As shown in FIG. 20, when the articles 16 have their pins up, switch 202' at the forward end of the tray must be inverted so as not to interfere with the spring depressor arm which in this case is arm 216 as shown in FIGS. 13A and 13B and includes a tray hold down arm 226.

FIG. 21 shows the arrangement for each end of the loader 12 having the articles 16 with the pins extending down. A cam operated pusher 46 pushes the substrate 16 into the channel and when the pins are down a spring hold down finger 206 of the type shown in FIGS. 8A–8C is provided at the entrance end of the groove 26 at the load station. A full position sensing switch 250 and an arrangement of the type shown in more detail in FIG. 14 is provided at the other end of the groove.

In FIG. 22 the pusher 46 pushes the articles into the tray with the pins up and a tray depressor finger 216 with its cooperating tray hold down arm 226 are provided at the entrance end of the groove at the load station. The full position sensing switch 250' and its assembly of the type shown in FIG. 15 are mounted at the other end of the groove.

FIG. 18 is a schematic illustration of the loader or unloader and especially the electrical controls therefor. There is an out of tray sensing switch 268 positioned to sense the lack of trays in unloading stack 32 or in loading stack 42. A tray fed down to horizontal surface 54 is detected by a switch 270 (load inhibit) and adjacent that switch there is a switch 272 (tray in place) at the unload station 34. At the right hand side of the table 54, for example, there is a further switch 274 (unload).

Three cams 276, 278 and 280 operate unload switch 282, index switch 284 and load switch 286, respectively.

Figure 23:
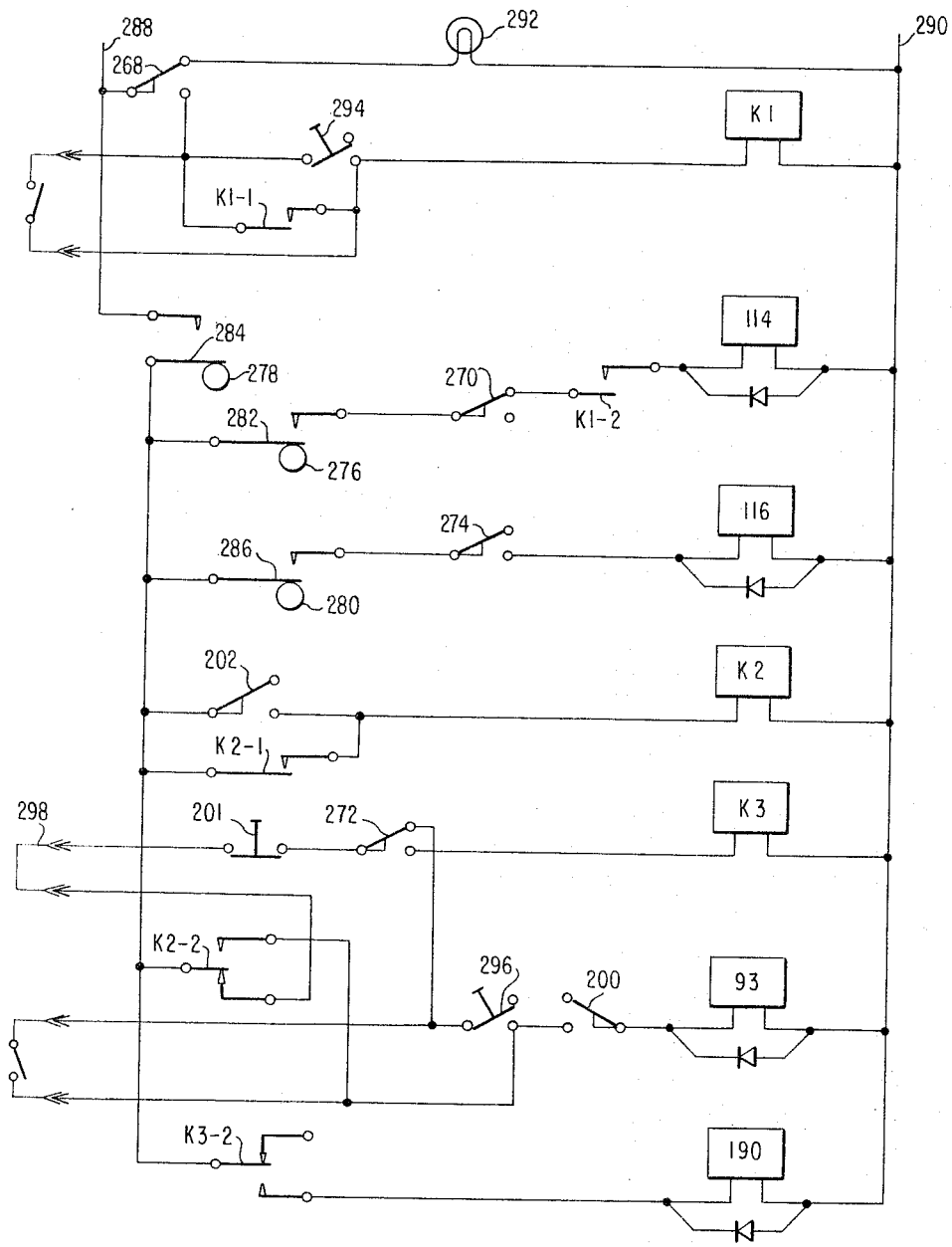
FIG. 23 is an electrical circuit diagram.

FIG. 23 is a simplified schematic electrical diagram of the control circuit of the unloader 10. A suitable source of power is supplied across leads 288, 290. When filled trays are loaded on the stack 32 they operate the out of trays switch 268 turning out the out of trays indicator light 292 and applying voltage to the automatic load circuit. Pressing a load switch 294 on the loader energizes relay K1 which then locks through relay holding contacts K1–1. Also on energization of relay K1 contacts K1–2 close to complete a circuit to the load clutch electromagnet 114, FIG. 16, through index cam 278 which operates contacts 284, the contacts of switch 282 of load cam 276, and the normally closed load inhibit switch 270.

The momentarily energized load clutch electromagnet 114 releases the one revolution clutch of the type shown in FIG. 12 to rotate the load shaft one revolution. Index cam 278 opens contacts 284 to deenergize the load clutch electromagnet.

Rotation of the load shaft one revolution causes the timed operation of elevators 68 and 69 and stack holding fingers 62 and 63 under the stack 32 of loaded trays.

The filled tray on the work plate 54 must be indexed one tray channel to position the first channel for unloading. Pressing the manual index switch 296 on the unloader, completes the circuit to index clutch electromagnet 93, FIG. 16, through the following components; contacts 284 of index cam 278, contacts K2–2 normally closed, the work station machine 298 which may include an interlock, manual tape return switch 201, tray in place switch 272 normally closed with the tray in unload position 34, and the tape returned switch 200 (since the tape is normally in retracted position).

The momentarily energized clutch electromagnet 93 on the index shaft releases the index shaft to rotate it one revolution, causing the walking beams 78 and 79 to horizontally index the tray one channel into the unloading station 34. At that position the tray in place switch 272 transfers to complete the circuit to relay K3 through tape return switch 201, the parent machine circuit, contacts K2–2, and index cam contacts 284. Energization of relay K3 closes contacts K3–2 applying voltage to pusher solenoid 190, FIG. 11, this shifts the drive of pusher tape 178 and causes the pusher tape to be driven into the tray channel 26 at the unload station 34.

When all of the articles 16 have been pushed out of channel at the unload station 34, the extended tape mechanically operates the tape extended switch 202, FIG. 11, to energize relay K2. Relay K2 locks on through holding contacts K2–1. Contacts K2–2 transfer and deenergize relay K3. Contacts K3–2 open to deenergize the pusher drive solenoid 190 causing spring 192 to shift the yoke 194 and retract the pusher tape 178. When the tape is fully retracted, the tape returned switch 200 closes and voltage is applied to the index clutch electromagnet 93. Index cam 278 opens contacts 284 and deenergizes relay K2 when the index shaft completes one revolution. The tray in place switch 272 closes to complete the circuit to relay K3 thus repeating the tray channel unloading operation cycle.

When the tray is indexed to the fifth channel at the unloading station, load inhibit switch 270 is uncovered and closes to complete the circuit to load clutch electromagnet 114 and a second filled tray is lowered to the work surface 54 adjacent the first tray, while its fifth channel is being unloaded.

When the fifth channel of the first tray is empty, the pusher tape 278, tray spring depressor arms, and tray hold down are retracted, and both trays are indexed one channel. Near the completion of the index cycle the first empty tray actuates unload switch 274 which completes the circuit to unload clutch electromagnet 116 through contacts 286 of unload cam 280 and through the index cam contacts 284. Energization of unload clutch electromagnet 116 releases the unload clutch and rotates the unload shaft one revolution. The empty tray is elevated to the unload stack and the unloading operation continues.

FIG. 24A is the timing chart for operation of lowering of elevators 68 and 69 and operating of the tray stack fingers 62 and 63 under stack 32 of unloader 10.

FIG. 24B is the timing circuit for raising elevators 70 and 72 and operating the tray stack fingers 64 and 66 under the empty stack 40 of the unloader 10.

FIG. 24C is a .5 second time cycle for operation of the walking beam and the tray spring depressor arms. FIGS. 24A, 24B and 24C are the same for the loader 12 or the unloader 10.

FIG. 25 is the cam data chart for the unloader 10 and the cams 276, 278, and 280 discused above.

For the loader, the electrical circuit is somewhat similar but includes certain differences to inhibit the pusher 46 after the full position switch has determined the full position of the channel in the groove.

FIG. 26 is an electrical schematic diagram of the electrical controls for the loader 12. The loader has four timing cams A1, A2, A3 and A4 controlling switches and mounted in a manner similar to the cams in FIG. 18. A source of voltage is applied across lines 300, 302 and the following sequence of electrical and mechanical operations will take place. When the empty trays are manually loaded onto the stack fingers 42, out of tray switch 268 transfers removing the voltage from indicator lamp 292 and applying it to the automatic load circuit. Pressing load switch S7 on the loader energizes the automatic load relay K1 which locks on through holding contacts K1-1. Contacts K1-2 close energizing load clutch electromagnet 114 if the following components complete the circuit; contacts K2-2 normally closed, contacts K6-2 in pusher mechanism 46 normally closed, unloaded switch 274 normally closed in the loader, index cam A2 contacts which make at 350° and break at 25°, load cam A1 contacts which make at 350° and break at 25°, and load inhibit switch 270.

The momentarily energized load clutch of electromagnet 114 releases the one revolution clutch which rotates the load shaft. Index cam A2 contacts open to deenergize the load clutch electromagnet 114.

The empty tray on the work plate is indexed one tray channel to position the first tray channel for loading. Pressing the manual index switch S8 on the loader completes the circuit to index clutch electromagnet 93 through the following components; K2-2 contacts normally closed, K6-2 contacts in pusher mechanism normally closed, index cam A2 contacts, unload switch 274, manual index switch S8.

Momentarily energized clutch electromagnet 93 releases the one revolution clutch which rotates the index shaft. The tray and place switch 272 closes to the pusher solenoid circuit 46'. A predetermined number of articles, for example, forty substrates are pushed into the tray channel which transfers the full position switch 250 to the index circuit. The tray loading cycle is repeated.

When the tray is indexed to the fifth channel at the loading station, the load inhibit switch 270 closes to complete the circuit to load clutch electromagnet 114. A second empty tray is lowered to the work surface adjacent the first tray.

When the fifth channel of the first tray is filled where the tray spring depressor arm is retracted and both trays are indexed one channel. Near the end of the completion of the index cycle the first filled tray actuates unload switch 274, which completes the circuit to unload electromagnet 116 through unload cam A3, K2-2, and K6-2 contacts. Unload check relay K6 is energized through unload reset switch S6 operated by cam A4 and unload switch S3 which is transferred. Contacts K6-1 close to apply power to the unload electromagnet 116 when the filled tray is raised and unload switch S3 transfers to the load circuit. Contacts K6-2 open to prevent index circuit operation.

With the electromagnet 116 energized, the unload clutch is released and the unload shaft rotates one revolution. Unload reset switch S6 opens to deenergize relay K6. Contacts K6-2 return to their normally closed position to apply power to either the pusher electromagnet 46' or the index electromagnet 93, depending on the position or condition of the switch 250 which senses whether or not the groove is full.

FIG. 27 is a chart of the cam data for cams A1-A4 of the loader. Cam A4 in this chart rotates five times the speed of cams A1 and A3.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An automatic tray handler system for handling a plurality of trays, each tray being adapted to contain a plurality of individual articles to be worked upon at a work station, the tray handler system comprising;
   (a) an automatic tray unloader on one side of the work station,
   (b) tray lowering means included in the unloader to feed article loaded trays carried by the unloader one at a time to a horizontal surface including an article unloader station in the unloader,
   (c) article unloading means to unload the articles from the loaded tray at the unloader station,
   (d) tray stacking means in the unloader for stacking the trays after they have been unloaded,
   (e) tray feeding means for feeding the trays from the tray lowering means through the unloader station to the tray stacking means,
   (f) conveying means for conveying the articles unloaded at the unloader station through the work station,
   (g) an automatic tray loader on the other side of the work station,
   (h) tray lowering means included in the loader to lower empty trays carried by the loader one at a time to a horizontal surface including an article loader station in the loader,
   (i) article loading means to load the articles from the conveying means at the loader station,
   (j) tray stacking means in the loader for stacking the trays after they have been loaded, and
   (k) tray feeding means for feeding trays through the loader from the tray lowering means to the tray stacking means.

2. An automatic horizontal tray handler for handling a plurality of trays, each tray having a plurality of longitudinal channels for receiving articles therein, the tray handler comprising;
   (a) tray support means for supporting a plurality of trays stacked on top of one another,
   (b) tray lowering means synchronized with the tray support means to lower one tray at a time from the bottom of the stacked trays to a horizontal surface of the horizontal tray handler,
   (c) a station at the horizontal surface of the tray handler,
   (d) means to handle and position articles relative to a channel of tray positioned at the station,
   (e) indexing feed means to feed a tray on the horizontal surface step by step transversely of the tray channels so that each channel of a tray will be aligned with the station in succeeding steps,
   (f) tray raising means synchronized with the feed means to raise a tray after all channels have passed the station, and
   (g) another tray support means for supporting a stack of trays raised by the tray raising means and synchronized with said tray raising means.

3. An automatic horizontal tray handler as defined in claim 2 wherein the indexing feed means includes a walking beam mechanism.

4. An automatic horizontal tray handler as defined in claim 2 further comprising electrical position sensing means for sensing the position of a tray on the horizontal surface and thereby controlling the tray raising and lowering means.

5. An automatic horizontal tray handler as defined in claim 2 wherein the tray raising means and tray lowering means are synchronized so that two trays may be indexed in unison, and one tray may be raised as the following tray is positioned with its lead channel at the loader or unloader station.

6. An automatic horizontal tray handler as defined in claim 2 wherein each tray support means includes a pair of tray support arms and the tray raising means and tray lowering means each include a pair of elevators driven from the same drive as the support arms and in synchronism therewith.

7. An automatic horizontal tray handler as defined in claim 2 wherein the station is an unloader station and the means to handle and position articles includes means to unload articles from a channel of a tray at the unloader station.

8. An automatic horizontal tray handler as defined in claim 7 wherein the unloader station comprises a driven tape carrying a pusher movable through a channel of a tray at the unload station.

9. An automatic horizontal tray handler as defined in claim 8 wherein the tape is driven through a slip clutch and electrical sensing means are positioned to sense the position of the pusher when the articles are all unloaded from a channel and when the pusher is retracted free of the channel.

10. An automatic horizontal tray handler as defined in claim 2 wherein the station is a loader station and the means to handle and position articles includes means to load articles into the channel of the tray positioned at the loader station.

11. An automatic horizontal tray handler as defined in claim 10 wherein the loader station comprises a pusher operable to push articles one at a time into a tray channel at the unloader station, electrical sensing means positioned to sense a full channel loaded by the pusher, and means for inhibiting the pusher and indexing the tray when the sensing means senses a full channel.

12. An automatic horizontal tray handler as defined in claim 2 wherein the trays include longitudinal exterior grooves of a dimension complementary with protruding lugs on the horizontal surface to assist in positioning the tray after indexing.

13. An automatic horizontal tray handler as defined in claim 2 wherein each tray includes a spring stop at each end thereof to hold the articles therein, and the tray handler further comprises at the station a spring holding means for holding the tray out of the way for loading or unloading.

14. An automatic horizontal tray handler as defined in claim 2 wherein each tray is reversible and the articles are modular circuit substrates with extending pins so that with reversible trays the substrates may be fed with the substrate pins up or the pins down.

15. An automatic horizontal tray handler as defined in claim 2 further comprising electrical sensing means adjacent the tray support means for sensing an absence of trays carried by the support means.

References Cited by the Examiner
UNITED STATES PATENTS

| | | | |
|---|---|---|---|
| 1,292,635 | 1/1919 | Parker | 214—6 |
| 2,744,372 | 5/1956 | Cleaveland et al. | 214—6 X |
| 2,821,825 | 2/1958 | Gartner | 214—1 X |
| 2,970,709 | 2/1961 | Gartner et al. | 214—301 |

HUGO O. SCHULZ, *Primary Examiner.*